United States Patent [19]

Katoh et al.

[11] 4,255,516

[45] Mar. 10, 1981

[54] PHOTOGRAPHIC SUPPORT CONTAINING DIFFERENT POLYESTER LAYERS

[75] Inventors: Kazunobu Katoh, Minami-Achigara; Saburo Fujita, Otsu; Toshihiro Otaki, Otsu; Shozi Nakashima, Otsu, all of Japan

[73] Assignees: Fuji Photo Film Co., Ltd.; Toray Industries, Inc., both of Japan

[21] Appl. No.: 141,529

[22] Filed: Apr. 18, 1980

[30] Foreign Application Priority Data

Apr. 23, 1979 [JP] Japan ................................. 54-50705

[51] Int. Cl.³ ............................................... G03C 1/78
[52] U.S. Cl. ..................................... 430/533; 428/480; 430/211; 430/535
[58] Field of Search ................ 428/480; 430/533, 211, 430/535

[56] References Cited

U.S. PATENT DOCUMENTS

| | | | |
|---|---|---|---|
| 3,685,734 | 8/1972 | Paciorek et al. | 428/480 |
| 3,775,152 | 11/1975 | Jacoby et al. | 430/533 |
| 3,944,699 | 3/1976 | Mathews et al. | 430/533 |
| 4,198,458 | 4/1980 | Mitsuighi et al. | 428/480 |

*Primary Examiner*—Jack P. Brammer
*Attorney, Agent, or Firm*—Sughrue, Rothwell, Mion, Zinn and Macpeak

[57] ABSTRACT

A photographic support of a composite polyester film in which additives and oligomers can be incorporated in the support without exerting any undesirable effects upon photographic characteristics, which film is constructed by an inner layer of polyester containing volatile diffusible substances or exudative substances, and a covering layer of another sort of polyester, with which both sides of the inner layer are covered, not containing the above-described substances judging from practical viewpoint and that, having a glass transition point equal to or higher than that of the inner layer, and which film is orientated along at least one prescribed axis.

17 Claims, No Drawings

PHOTOGRAPHIC SUPPORT CONTAINING DIFFERENT POLYESTER LAYERS

BACKGROUND OF THE INVENTION

1. Field of the Invention

This invention relates to a photographic support and more particularly, it is concerned with an improved photographic support in which deposition or sedimentary adhesion of volatile diffusible substances or exudative substances, which are contained in polyester employed for making an inner layer of the support, onto the surfaces of the support is prevented from occurring by covering both sides of the inner layer with a different type of polyester.

2. Description of the Prior Art

Polyester films have often been used as photographic supports in view of their intrinsically desirable properties, such as high physical strength, durability, dimensional stability with respect to variations in temperature and humidity, and transparency.

However, the addition of commonly used additives, such as an antioxidant, an ultraviolet ray-absorbing agent, a thermal stabilizer, flame retardant agent, etc., to a polyester film support, which has been tried with the intention of further improvement upon such properties of polyester as described above, and the presence of remaining oligomers in the polyester film in considerable amounts has frequently caused troubles that the additives or the oligomers "smoke" or accumulate at the film surface due to their volatile diffusibility or exudative property in a film-forming process. For example, such problems can occur: (1) when passing the polyester through a hopper of an extruder (in an extreme case, even when they are compatible with the polyester to some degree); (2) when passing through the vicinity of a die forming part of an extruder; (3) when producing a fresh film just after the polyester has exited from the die; or (4) in a subsequent process of drawing the film produced or treating the drawn film with heat. High temperatures are generally used in the above-described film-forming and film-treating processes because polyesters have, in general, heat resistant properties, e.g., a high melting point, and it is also excellent in other thermal characteristics. In addition, even though problems may not occur during the film-forming process, unfavorable phenomena similar to those described above may take place during processing, for example, in a process wherein the photographic support is exposed to a high temperature atmosphere for a long period of time.

On the other hand, as disclosed in Japanese Patent Application (OPI) Nos. 101417/78 and 146773/78 (the term "OPI" as used herein refers to a "published unexamined Japanese patent application"), copolymerized polyethylene terephthalate film containing as a copolymerizing component polyalkylene glycol in a fraction of 3 to 20% by weight has lower glass transition point than usual polyester film prepared by using, in general, ethylene glycol as a copolymerizing component and, therefore, for example, when the above-described copolymerized polyethylene terephthalate film is allowed to stand at a high temperature of 100° C. or above, oligomers exude from the interior of the film toward the surface thereof, accumulating at the surface of the film, resulting in a change in the appearance of the surface, viz., from transparent to milky. That is to say, there is an increase in haze and a large decrease in transparency.

Accordingly, although the water permeability of this polyester is high due to the use of polyalkylene glycol as a copolymerizing component thereof, and therefore this polyester is particularly useful as a film support for instant photography, the aesthetic value of the image is markedly decreased when imagewise exposure is performed or when the image formed is observed from the side of such a polyester film support in which an increase in haze has occurred (such as by allowing the photographic film to stand in a high temperature atmosphere when a subbing layer and various photographic layers are provided on such a film support, or when such layers processed).

Further, since volatile diffusible or exudative substances, such as the above-described various kinds of additives, migrate and form deposits on the surface of a polyester film support in the support film-forming process or in the subsequent processes of providing an undercoating for various photographic layers, coating various photographic layers and/or processing the layers so provided, the high transparency necessary for the photographic film support cannot be attained. Also, undesirable delamination of a photographic layer through the lowering in adhesiveness of the film support to the photographic layer coated thereon can occur. Furthermore, the deposits accumulated on the film support can exert chemically undesirable effects upon the photographic layers, such as causing photographic fog, desensitization, and spots.

SUMMARY OF THE INVENTION

Objects of the present invention include overcoming the above-described problems regarding polyester film supports so that volatile diffusible or exudative substances which may exert adverse influences upon photographic characteristics, such as certain additives can be incorporated into a photographic film support without causing the aforementioned undesirable effects.

The above-described objects are attained by use of a photographic support comprising a composite polyester film prepared by covering both sides of an inner layer consisting of polyester which contains volatile diffusible or exudative substances capable of exerting adverse influences on photographic materials and the like with a different type of polyester which is substantially free of adverse amounts of such volatile diffusible or exudative substances, and that has a glass transition point equal to or higher than the inner layer, and then orientating the resulting composite polyester along at least one prescribed axis.

DETAILED DESCRIPTION OF THE INVENTION

Polyesters that can be employed as the covering layers include polyethylene terephthalate, polyethylene-2,6-naphthalate, and copolymers containing the aforementioned polyesters in proportions of 85 mol% or more. Polyesters that can be employed as the inner layer include polyethylene terephthalate, polyethylene-2,6-naphthalate, and copolymers containing the aforementioned polyesters in proportions of 85 mol% or more and of which glass transition temperature is equal to or lower than those of the polyesters employed as the covering layer. When polyesters having the same glass transition temperature are used as the covering layer and the inner layer, the polyester used as the covering layer is substantially free of adverse amount of volatile diffusible or exudative substance. A desirable difference in the glass transition temperature between the polyesters for the inner layer and the polyesters for the covering layer is preferably about 0° to 70° C. and more preferably 5° to 50° C.

Volatile or exudative substances of concern in the present invention are, in general, those which have melting points of 240° C. or lower, with specific examples including: antioxidants such as 2,6-tert-butyl-p-cresol, 2,2'-methylenebis(4-methyl-6-tert-butylphenyl), 4,4'-thiobis(3-methyl-6-tert-butylphenol), etc.; ultraviolet ray absorbents such as 2-(3',5'-di-tert-amyl-2'-hydroxyphenyl)benzotriazole, 2-(2'-hydroxy-3',5'-di-tert-butylphenyl)-5-chlorobenzotriazole, 2-(2',5'-di-tert-butyl-2-hydroxyphenyl)benzotriazole, 2-(2'-hydroxy-5'-methylphenyl)benzotriazole, 2-(hydroxy-5-tert-butylphenyl)-benzotriazole, 2-hydroxy-4-methoxybenzophenone, 2,2'-dihydroxy-4-methoxybenzophenone, 2-hydroxy-4-methoxy-2'-carboxybenzophenone, 2-hydroxy-4-n-octoxybenzophenone, 2,4-dihydroxybenzophenone, 2-ethylhexyl-2-cyano-3,5'-diphenylacrylate, p-octylphenylsalicylate, 2,4-di-tert-butylphenyl-3,5-di-tert-butyl-4-hydroxybenzoate, etc.; flame retardant agents such as decabromodiphenyl ether, hexabromobenzene, tetrabromophthalic anhydride, tetrabromobisphenol A, etc.; and oligomers produced at the time of melt extrusion and at the time of heat treatment after film formation.

Specific examples of the oligomers in case of polyethylene terephthalate include linear oligomers having general formulae: $HO-T-[G-T]_n-OH$, $H-[G-T]_n-OH$ and $H-[G-T]_n-G-H$, wherein T represents a terephthalic acid residue of the formula

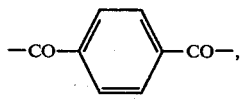

G represents an ethylene glycol residue of the formula $-O-CH_2-CH_2-O-$ and n represents an integer of 1 to 3. Furthermore, the oligomer can be a cyclic trimer, a cyclic tetramer, a cyclic pentamer, and cyclic dimers including diethylene glycol. The exact structures of the oligomers, of course, depends upon the kinds of polyester employed.

Including oligomers in a polyester film is unnecessary from the viewpoint of the film's characteristics, and they are not additives to the film but those which are essentially contained in polyester. The content of oligomers is usually measured after extraction with xylene performed over 24 hours, and it is generally 3.5% by weight or less.

Typical concentrations of volatile diffusible or exudative substances that can exert adverse influences upon photographic properties in which such substances may be contained in the inner layer is, in general, 0.05 to 20% by weight. The covering layers are not required to completely exclude all such substances, and may contain such substances in amounts smaller than the inner layer does and in concentrations less than those concentrations at which adverse phenomena may be caused to an impermissible extent. That is to say, it is substantially free from such substances. In general, a permissible concentration of such substances in the covering layers is 4% by weight or less.

A representative volatile diffusible or exudative substances which exerts an adverse influence upon photographic properties is oligomers, as described above. In regard to oligomers, the covering layers likewise are not required to contain at all the oligomers, and may contain small amounts of oligomers, if the total concentration of oligomers in the covering layers is at least lower than in the inner layer and that it corresponds to a concentration such that adverse phenomena may be caused only to a permissible extent, or lower. A desirable difference in oligomer content between the inner layer and the covering layers is preferably at least 0.3% by weight and more preferably at least 0.5% by weight. Moreover, the desirable difference in the oligomer content depends upon the difference in the glass transition point between the inner layer and the covering layer. However, a preferable oligomer content in the covering layer is 1.8% by weight or lower and particularly 1.5% by weight or lower.

The present invention is not intended to be construed as being limited to substances capable of exerting adverse influences upon photographic abilities with respect to volatile diffusible or exudative substances. The present invention can be also desirably applied to polyester-containing substances so that they may not exert any adverse effects upon photographic abilities, but also effects intentionally brought about by the addition thereof may be reduced through removal from polyester due to volatile diffusion or exudation.

The lower the glass transition point of a film, the higher the exudation speed of the above-described substances from the film. Consequently, the use of a covering layer that has a glass transition temperature lower than that of the inner layer cannot solve the problems of the prior art from a practical point of view. A desirable difference in the glass transition point depends upon the content of the aforementioned substances in the inner layer, provided that at any rate the glass transition point of the covering layer is higher than that of the inner layer, and furthermore, that the larger the amount of such substances in the inner layer, the higher the glass transition temperature the covering layer should be.

As a covering layer is made thicker, although it becomes more effective in the prevention of diffusion and exudation of the aforementioned substances, it causes unfavorable characteristics for the film as a whole, since the characteristics of the film depend upon the desirable properties of the inner layer. A preferred thickness for the inner layer is at least 50% or more of the total thickness of the film, more preferably at least 65%, and most preferably at least 80%. Since exudation of oligomers can be satisfactorily prevented from occurring by this invention even when the covering layer is very thin, film-forming conditions such as a drawing temperature, etc., can be adjusted to conditions close to the conditions desirably adopted to the formation of the inner layer, even when the polyester constituting the covering layer is different from the polyester contained in the inner layer. The thickness of the covering layer on either side of the inner layer should be at least about 0.1 micron. Preferably the thickness is at least 0.5 micron, and more preferably, at least 1 micron. The covering layer should be provided on both sides of the inner layer, but both covering layers are not always required to have the same thickness.

A thickness of the inner layer, though not critical, is preferably from about 20 microns to 300 microns, and more preferably from 30 microns to 200 microns.

In both the covering layer and the inner layer, such substances as are not subject to volatile diffusion or exudation when incorporated in the layer, for example, inorganic particles, organic stabilizers and up to 15 wt% of other polymers, may be incorporated.

The composite film of the present invention can be obtained by extruding two or more kinds of polyesters, e.g., streams of polyesters are directed so as to join each other in a molten state at the position of a die or the position before the die, by means of plural extruders and/or gear pumps, cooling the polyester film extruded, and then drawing and orientating the cooled film along at least one prescribed axis. If the film was not orientated, the resulting non-orientated film does not have sufficient transparency and strength.

The drawing of the layers may be carried out in a usual manner. For instance, when polyethylene terephthalate is employed for both the inner layer and the covering layer, drawing of a composite film extruded is, in general, carried out in the direction of flow from the extruding machine, stretching to about twice the original length in the case of biaxial drawing, stretching in the transverse direction to form 2 to 5 the original width, at a temperature of from about 80° C. to 160° C. When some heat treatment is required such as a heat treatment for improving dimensional stability of the film, drawing is performed at a temperature of preferably 150° C. to 240° C. In addition, it is preferable to allow the film-forming condition of a composite polyester film to correspond to the film-forming condition of polyester most desirably used for the inner layer thereof. Moreover, in the case of biaxial drawing, various kinds of combinations in regard to a drawing manner, such as successive drawing, simultaneous drawing, re-drawing performed thereafter or so on, can be used.

On the other hand, a composite film according to the invention can also be formed by laminating covering layer film(s) on an inner layer film.

As the polyester constituting the inner layer of a composite polyester film according to the present invention, polyethylene terephthalate copolymers containing as one of copolymerizing components polyalkylene glycol in a fraction of 3 to 20% by weight, as described in Japanese Patent Application (OPI) No. 101417/78, are preferably employed. Preferable molecular weight of polyalkylene glycol to be used therein ranges from 300 to 30,000 and more particularly, from 800 to 20,000.

Preferable examples of such polyalkylene glycol include polyethylene glycol, polypropylene glycol, poly(ethylene-propylene)glycol copolymers and the like. Of these polymers, polyethylene glycol is particularly preferred to be employed.

In case that a polyethylene terephthalate film containing polyalkylene glycol as a copolymerizing component is employed for the inner layer, it is desired to use general polyethylene terephthalate, which does not contain polyalkylene glycol therein, as the covering layer.

A photographic support consisting of a composite polyester film according to the present invention is particularly useful as a film support in instant photography. Specific examples of film supports for instant photographs are described in U.S. Pat. Nos. 2,983,605, 3,415,644, 3,415,645, 3,415,646, 3,578,540, 3,573,043, 3,615,421, 3,594,164, 3,594,165, 3,620,724, 3,635,707 and 3,993,486, British Pat. Nos. 1,269,805 and 1,330,052, and so on. In case of the so-called "integral unit film", such as SX-70 film (trade name, produced by Polaroid Corporation) and PR-10 film (trade name, produced by Eastman Kodak Co.), Japanese Patent Application (OPI) No. 101417/78 has described the attainment of a great improvement with respect to fading or discoloration of the image by removing water contained in a developing solution (which is retained in a rupturable container before developing processing) from the film unit as soon as possible after developing processing. Accordingly, the photographic support of the present invention is particularly useful for the support of such an "integral unit film" as described above.

To the photographic support of the present invention, it is desirable to add dyes or pigments capable of absorbing or scattering lights with the intention of preventing undesirable lights from unintentionally being admitted into the camera through the film support. As such dyes, known dyes, such as those described, for example, in Japanese Patent Application Nos. 104400/77 and 104401/77, Japanese Patent Appliction (OPI) No. 14245/72, British Pat. No. 1,287,479, U.S. Pat. Nos. 2,622,026, 3,728,124 and 3,822,132, Japanese Patent Application (OPI) No. 34958/73 and Japanese Patent Publication No. 8735/72, may be employed. These dyes can be added to the polyester in amounts of from about $10^1$ to $10^3$ ppm, and their optimum amounts depend upon the purposes to be attained. The addition of dyes into polyester calls for dyes having special heat resisting properties. However, many of the dyes having sufficiently high heat resisting properties exert undesirable effects upon photographic layers. Because of such a peculiar restriction to the photographic support, usable kinds of dyes which can be added thereto have been restricted to very narrow group. If added only to the inner layer according to the method of the present invention, conventionally unusable dyes become usable, since direct contact with photographic layers can be avoided therein. Therefore, the allowable range of choices is expanded, and consequently it now becomes feasible to choose dyes having characteristics that more satisfactorily achieve the purpose of including the dye.

Also, the light fastness of images obtained in instant photography is improved by the addition of an ultraviolet ray absorbing agent to a film support. It has also been discovered according to the present invention that the above-described various kinds of ultraviolet ray absorbing agents can be added without adverse effects by exudation onto the surface of a film support.

In addition, when the composite film is employed as the support for an instant photograph, fine particles of inorganic materials such as silica, titanium dioxide, etc., may be added, if desired, to one or both of the two covering layers, for the purpose of improving upon the frictional properties of the surface(s) thereof. Moreover, it is also effective to mold the surface of the covering layer so as to form fine planar pattern having a desired shape with the intention of decorating aesthetically the surface from the side of which the photograph is to be observed.

Furthermore, additives not substantially exuding to the surface, and those which are substantially harmless to photographic properties even though they exude to the surface, can be added to the covering layer(s). For instance, additives such as dyes, pigments, antioxidants, ultraviolet ray absorbing agents, thermal stabilizers and flame retardant agents, which do not exude substantially or are substantially harmless to photographic properties can be also added to the covering layer(s). In particular, if the selection of a harmless dyes is possible when the addition of light streak preventing dyes is intended, in some cases the addition to the covering layer is rather easier and more advantageous than the addition thereof to the inner layer, from the viewpoint of the film-forming process for the polyester base containing such an agent.

A subbing layer is provided in order to coat a photographic layer on the photographic support of the present invention. It is possible to use known various compositions for the subbing layer depending upon the composition of a photographic layer to be coated thereon, and the subbing layer increases adhesiveness between the support and the photographic layer. When the photographic layer is an organic polymer layer containing gelatin, it is advantageous that a gelatin dispersion containing a phenol derivative of the like (as described in Japanese Patent Publication No. 24270/72 and Japanese Patent Application (OPI) No. 25571/76), an organic latex containing vinylidene chloride as one of copolymerizing components (as described in U.S. Pat. Nos. 3,143,421, 3,586,508, 2,698,235 and 3,567,452), or an SBR resin latex containing butadiene as one of copolymerizing components (as described in U.S. Pat. No. 3,615,556 and Japanese Patent Application (OPI) No. 114120/76), be firmly bonded to the polyester base by drying at a high temperature ranging from 100° C. to 160° C. On the other hand, when a mordanting layer is to be coated on the polyester base, acid processed gelatin can also be used as the gelatin, if necessary.

In other cases, when organic polymer layers comprising of cellulose derivatives such as cellulose acetate, cellulose acetate butyrate and the like, polyacrylic acid or acrylic acid-butyl acrylate (8:2 by weight) copolymer are to be coated, subbing compositions having good adhesivenesses to these organic polymer layers are selected. Since these subbing layers must be dried at high temperatures ranging from 100° C. to 160° C. for the purpose of attaining sufficiently high adhesiveness, under such conditions components exudating and depositing that are contained in polyester bases lead to undesirable results, such as deterioration in adhesion characteristics and lowering in transparency resulting from the increase of haze.

After the subbing layer is provided on the polyester base, various kinds of photographic layers are provided thereon, depending upon the purpose of the end-use of the sensitive material.

Besides conventional silver halide emulsion layers, an antihalation layer, a backing layer, and other known conventional layers, various other photographic layers as described in U.S. Pat. No. 3,958,995, Japanese Patent Application (OPI) No. 61228/75, U.S. Pat. No. 3,859,096, and Japanese Patent Publication Nos. 33697/73, 21660/74 and 16356/71, including layer such as a mordanting image-receiving layer, an alkali neutralizing layer, a back layer, and so on, are provided in the case of an instant photographic element. In addition, other various kinds of photographic layers as described in *Research Disclosure*, No. 15162 November 1976) can be also provided.

The mordanting image-receiving layer is formed by coating a solution prepared by dissolving a mixture of an organic polymer containing tertiary or quaternary nitrogen atoms with a hydrophilic polymer such as gelatin, polyvinyl alcohol or so on in water or a mixed solvent comprising of water and organic solvents such as acetone, ethanol, methanol, etc., according to a conventional coating technique. Drying is usually carried out by blowing cool air against the mordanting image-receiving layer coated to obtain setting of the gelatin, and then blowing warm wind thereupon to obtain the drying thereof. Optionally, the layer may be dried at a high temperature of from 80° C. to 120° C.

For purposes of producing an instant photographic material, organic polymer layers, which require the use of various kinds of organic solvents and drying at high temperatures of 80° C. or above, in addition to the mordanting image-receiving layer, can be provided using conventional coating techniques. For example, an alkali neutralizing layer consisting of polyacrylic acid or acrylic acid-butylacrylate copolymer and a neutralization timing layer consisting of cellulose acetate are provided.

Furthermore, an organic polymer layer having a thickness necessary to keep a curl balance, which consists of, for example, gelatin, polyvinyl alcohol, cellulose ester, polyvinyl butyral or the like, may be optionally provided on the opposite side of the element with respect to the side where the light-sensitive layers and the neutralizing layer are provided.

The photographic film support obtained in accordance with an embodiment of the present invention can exhibit its characteristics to the greatest extent when used for producing an instant photographic element, but it can be also used to advantage as a film support for conventionally known, ordinary photographic materials. For example, it can be employed as a support for general color films, general black-and-white films, sensitive materials for printing and so on.

The present invention will now be illustrated in greater detail by reference to the following examples.

EXAMPLE 1

Preparation of Polyester Film Support

Polyethylene terephthalate containing oligomers in a content of 1.5% by weight was used as the inner layer, and both surfaces of the inner layer were covered with polyethylene terephthalate containing oligomers in a content of 0.33% by weight to result in compounding thereof. Oligomers content in polyethylene terephthalate was examined by boiling the polyethylene terephthalate and extracting the oligomers with xylene for 24 hours. The resulting compounded polyethylene terephthalate was extruded through a die in a form of film. The resulting film was drawn in one direction at a temperature of 90° C. until the length in the drawing direction became 3.3 times the original length, and then it was drawn in a direction perpendicular to the previous drawing direction at a temperature of 92° C. till the length became 3.5 times. Subsequently, the film was subjected to a thermal treatment at a temperature of 210° C. Thus, a transparent, biaxially elongated polyethylene terephthalate film was obtained. The total thickness of the thus obtained composite film was 90 microns, and the thicknesses of each of the covering layers were 1.5 microns.

COMPARISON 1

Preparation of Polyester Film Support for Comparison

A monolayer film having a thickness of 90 microns was prepared using the same polyethylene terephthalate as employed for forming the inner layer in Example 1 under the same conditions regarding the extrusion, the drawing and the thermal treatment as in Example 1. No problems occurred in the process of film formation. No difference in transparency was observed between this film and the composite film obtained in Example 1.

COMPARISON 2

Preparation of Another Polyester Film Support for Comparison

Polyethylene terephthalate copolymerized with polyethylene glycol having average molecular weight of 800 in a fraction of 6% by weight ($[\eta]=0.63$) was heated at a temperature of 285° C. and then extruded to be cast as a film. Next, it was subjected to simultaneous biaxial elongations to 3.3 times the original dimensions at a temperature of 75° C., followed by a thermal treatment at a temperature of 210° C. for 20 seconds. The film obtained had a thickness of 90 microns, and it was transparent and beautiful in appearance.

EXAMPLE 2

Preparation of Another Polyester Film Support

The polyester obtained in Comparison 2 was arranged as the inner layer and polyethylene terephthalate ($[\eta]=0.66$) was arranged on both sides of the inner layer, and they were compounded using a coextrusion technique. The compounded polyester was subjected to the film forming treatment under the same conditions as in Comparison 2. The thus obtained composite film had a total thickness of 90 microns, and each of the covering layers had a thickness of 2 microns.

EXAMPLE 3

Application to Sensitive Sheet

On each of the polyester supports obtained in Example 1, Example 2, Comparison 1 and Comparison 2, respectively, the following layers were coated in the order of description to prepare a sensitive sheet. The values in parentheses represent coated weights per square meter (g/m²).

(1) a subbing layer consisting of acid processed gelatin (0.5)

(2) a mordanting layer consisting of acid processed gelatin (3.0) and polyvinylbenzyl-tri-n-hexylbenzyl ammonium chloride (3.0)

(3) a light reflecting layer consisting of titanium dioxide (20) and gelatin (2.0)

(4) a light shielding layer consisting of carbon black (2.7) and gelatin (2.7)

(5) a layer containing a cyan dye image-providing compound of the structural formula shown below (0.50), diethyllaurylamide (0.25) and gelatin (1.14)

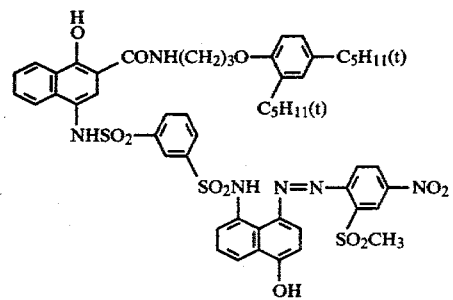

(6) a layer containing a red-sensitive, internal latent image type direct reversal silver iodobromide emulsion (containing 2 mol% of silver iodide, 1.9 g/m² of silver and 1.4 g/m² of gelatin), a fogging agent of the structural formula shown below (0.028) and sodium dodecylhydroquinonesulfonate (0.13)

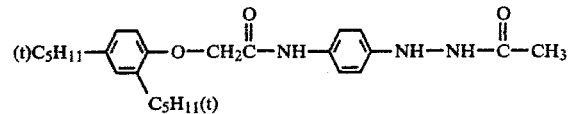

(7) a layer containing gelatin (2.6) and 2,5-dioctylhydroquinone (1.0)

(8) a layer containing a magenta dye image-providing compound of the structural formula shown below (0.45), diethyllaurylamide (0.10), 2,5-di-t-butylhydroquinone (0.0074) and gelatin (0.76)

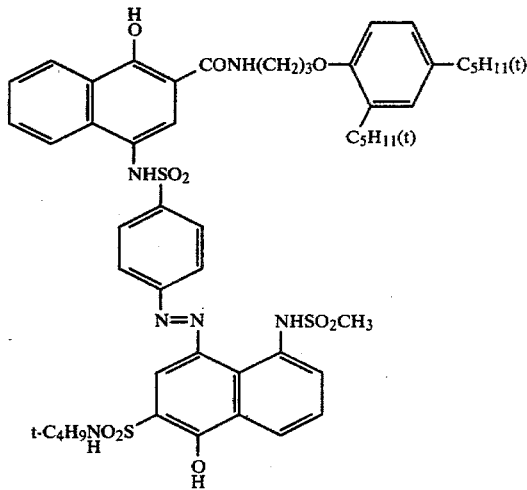

(9) a layer containing a green sensitive internal latent image type direct reversal silver iodobromide emulsion (containing 2 mol% of silver iodide, 1.4 g/m² of silver and 1.0 g/m² of gelatin), the same fogging agent as added to the layer (5) above (0.024) and sodium dodecylhydroquinonesulfonate (0.11)

(10) a layer containing gelatin (2.6) and 2,5-dioctylhydroquinone (1.0)

(11) a layer containing a yellow dye image providing compound of the structural formula shown below (0.78), diethyllaurylamide (0.16), 2,5-di-t-butylhydroquinone (0.012) and gelatin (0.78)

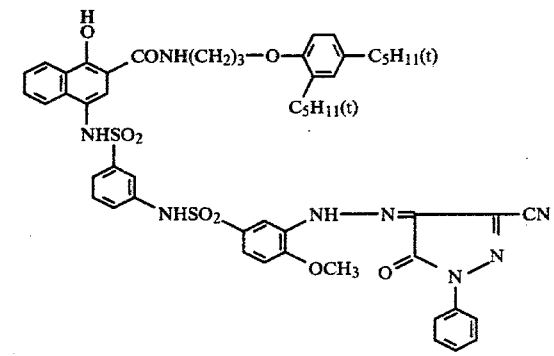

(12) a layer containing a blue sensitive internal latent image type direct reversal silver iodobromide emulsion (containing 2 mol% of silver iodide, 2.2 g/m² of silver and 1.7 g/m² of gelatin), the same fogging agent as added to the layer (5) above (0.020) and sodium dodecylhydroquinonesulfonate (0.094)

(13) a layer containing gelatin (0.94)

Then 0.8 g portions of a processing solution having the composition described below as charged into a pressure rupturable container for developing the photographic elements.

| Composition of Processing Solution | |
|---|---|
| 1-Phenyl-4-methyl-4-hydroxymethyl-3-pyrazolidinone | 10 g |
| Methyl Hydroquinone | 0.18 g |
| 5-Methylbenzotriazole | 4.0 g |
| Sodium Sulfite (anhydrous) | 1.0 g |
| Sodium Salt of Carboxymethyl Cellulose | 40.0 g |
| Carbon Black | 150 g |
| Potassium Hydroxide (28% water solution) | 200 ml |
| H₂O | 550 ml |

PROCESSING PROCESS

After each of the above-described sensitive sheets was exposed to light through color testing chart, the containers were ruptured and the above-described processing solution was spread in a layer form having a thickness of 85 microns over the flat polyester base (with an aid of pressure-applying rollers). Such a processing was carried out at a temperature of 25° C. One hour after the processing solution had been spread, the blue density ($D^B$), green density ($D^G$) and red density ($D^R$) produced in the image-receiving layer were measured from the side of the transparent support of the sensitive sheet by means of a Macbeth reflective densitometer.

In Comparisons 1 and 2, haze was observed all over the transferred image, thereby lowering the maximum density and the saturation of color, resulting in the production of an image having undesirable qualities. On the other hand, the supports in Examples 1 and 2 showed reduced haze and consequently, clear desirable images were produced thereon.

According to the results of measurements of the degree of haze generated by drying the coated subbing layer in each of the aforementioned sensitive sheets by means of a known densitometer, the degree of haze was 7% in Comparison 1 and 15% in Comparison 2, while it was less than 1% in either of Examples 1 or 2. Integrating sphere type turbidimeter SEP-H-S produced by Nippon Seimitsu Kogaku K.K. was used as a haze meter.

EXAMPLE 4

Application to Cover Sheet

On each of supports obtained in Examples 1 and 2 and Comparisons 1 and 2 were coated the layers as described below, in the same order listed, in order to prepare a cover sheet.

(1) a subbing layer containing gelatin (0.5)

(2) a layer containing acrylic acid-butylacrylate (80:20 by weight) copolymer having viscosity of about 4,000 cp measured in form of solution dissolved in water-acetone mixture in a concentration of 25% by weight (22) and 1,4-bis(2,3'-epoxypropoxy)butane of the structural formula shown below (0.44)

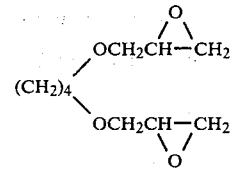

(3) a layer containing acetyl cellulose (which produced 39.4 g of acetyl group by hydrolysis of 100 g portion thereof) (3.8), styrene-maleic anhydride (about 60:40) copolymer having a molecular weight of about 50,000 (0.2) and 5-(β-cyanoethylthio)-1-phenyltetrazole (0.115)

(4) a layer containing vinylidene chloride-methylacrylateacrylic acid (85:12:3 by weight) copolymer latex (2.5) and polymethylmethacrylate latex having a grain size of 1 to 3 microns (0.05)

The cover sheets obtained using the supports prepared in Comparisons 1 and 2 showed high degree of haze, and when the sensitive sheet prepared using the support of Example 1 according to procedures described in Example 3 was subjected to imagewise exposure through each of such cover sheets and then, to diffusion transfer processing in the same manner as in Example 3, a greater drop in sharpness of the image obtained was observed, as compared with the case where imagewise exposure was performed without laying such cover sheets between a light source and the sensitive sheet. On the other hand, when the cover sheets prepared using the supports obtained in Examples 1 and 2 were employed, virtually no decrease in sharpness was observed.

As a result of following the decrease of the water content in the spread processing solution after the diffusion transfer processing, it was found out that the elimination of 90% or more of water required about one month in cases where the supports of Example 1 and Comparison 1 were employed, but about 1.5 weeks were required in cases where the supports of Example 2 and Comparison 2.

Moreover, deterioration in the quality of the transferred image, such as the increase of stains in highlighted areas, the increase in the cyan color density and the magenta color density, and so on, occurred in both cover sheets prepared using the supports of Example 1 and Comparison 1, while such deterioration did not occur in the cover sheets prepared using the supports of Example 2 and Comparison 2.

As is apparent from the above-described results, the production of transferred image having high quality could be attained by using the support of Example 2 because of its high water permeability and reduced haze.

EXAMPLE 5

A mixture of dyes having structural formulae (I), (II) and (III) (mixing ratio by weight=1:2:3) was added to the polyester employed for the inner layer in Example 2 in a proportion of 100 ppm:

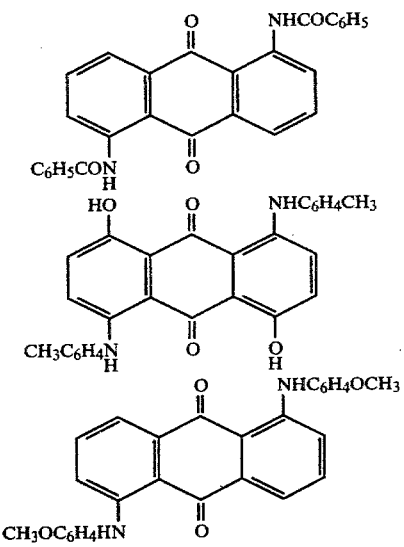

A composite film having a thickness of 90 microns was prepared in the same manner as in Example 2, except that the above-described dye mixture was added to polyester employed as the inner layer.

A cover sheet was prepared by coating on this composite film the same layers as described in Example 4.

No adverse effects upon photographic properties resulting from exudation of dyes were detected, and the occurrence of light streaks was effectively prevented by the addition of these dyes.

While the invention has been described in detail and with reference to specific embodiments thereof, it will be apparent to one skilled in the art that various changes and modifications can be made therein without departing from the spirit and scope thereof.

What is claimed is:

1. A photographic support comprising a composite polyester film having an inner layer of polyester containing volatile diffusible substances or exudative substances, and having covering layers on both sides thereof formed of a different type of polyester substantially free of adverse amounts of such volatile diffusible and exudative substances and having a glass transition temperature equal to or higher than that of the inner layer, said composite film being oriented along at least one prescribed axis.

2. A photographic support as in claim 1, wherein said covering layers contain 4% by weight or less of volatile diffusible substances or exudative substances.

3. A photographic support as in claim 1 or 2, wherein said volatile or exudative substances are oligomers, antioxidants, ultraviolet ray absorbing agents and dyes that have melting points of 240° C. or lower and which exert adverse influences upon the properties of a photographic element.

4. A photographic support as in claim 1 or 2, wherein said volatile or exudative substances are oligomers.

5. A photographic support as in claim 4, wherein a difference in the content of said oligomers between the inner layer and the covering layer is 0.3% by weight or more.

6. A photographic support as in claim 4, wherein a difference in the content of said oligomers between the inner layer and the covering layer is 0.5% by weight or more.

7. A photographic support as in claim 1, wherein said polyester constituting the inner layer is polyethylene terephthalate containing polyalkylene glycol as one of the copolymerizing components.

8. A photographic support as in claim 7, wherein the fraction of said polyalkylene glycol in the polyethylene terephthalate copolymer is from about 3 to 20% by weight.

9. A photographic support as in claim 7, wherein said polyalkylene glycol is polyethylene glycol having a molecular weight of from 300 to 30,000.

10. A photographic support as in claim 9, wherein said polyalkylene glycol is polyethylene glycol having a molecular weight of from 800 to 20,000.

11. A photographic support as in claim 1 or 2, wherein said covering layers have a thickness of at least $0.1\mu$.

12. A photographic support as in claim 1 or 2, wherein said covering layers have a thickness of at least $0.5\mu$.

13. A photographic support as in claim 1 or 2, wherein said covering layers have a thickness of at least $1\mu$.

14. A photographic support as in claim 1 or 2, wherein the inner layer has a thickness of from about $20\mu$ to $300\mu$.

15. A photographic support as in claim 1 or 2, wherein the inner layer has a thickness of from $30\mu$ to $200\mu$.

16. A color photographic light-sensitive element for a diffusion transfer process including a photographic support as in claim 1.

17. A color photographic element as in claim 16, wherein said color photographic light-sensitive element for a diffusion transfer process is an integral unit film.

* * * * *